(12) United States Patent
Weingertner (10) Patent No.: US 10,341,904 B2
(45) Date of Patent: Jul. 2, 2019

(54) COMMUNICATION TERMINAL AND METHOD FOR SWITCHING A CALL BETWEEN RADIO ACCESS TECHNOLOGIES

(71) Applicant: Intel Corporation, Santa Clara, CA (US)

(72) Inventor: Philippe Weingertner, Fayence (FR)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 14/670,543

(22) Filed: Mar. 27, 2015

(65) Prior Publication Data

US 2016/0286438 A1 Sep. 29, 2016

(51) Int. Cl.
*H04W 36/00* (2009.01)
*H04M 15/00* (2006.01)
(Continued)

(52) U.S. Cl.
CPC ....... *H04W 36/0022* (2013.01); *H04M 15/56* (2013.01); *H04M 15/57* (2013.01);
(Continued)

(58) Field of Classification Search
CPC ..... H04W 36/30; H04W 36/00; H04W 15/56; H04W 15/57; H04W 84/12; H04W 88/06;
(Continued)

(56) References Cited

U.S. PATENT DOCUMENTS 7,613,171 B2 * 11/2009 Zehavi ................ H04L 12/5692
370/338
8,391,873 B2 * 3/2013 Deshpande ......... H04L 65/4007
370/356
(Continued)

FOREIGN PATENT DOCUMENTS

CN 1798107 7/2006
CN 101064718 A 10/2007
CN 101491060 A 7/2009

OTHER PUBLICATIONS

3GPP TS 23.402, 3rd Generation Partnership Project; Technical Specification Group Services and System Aspects; Architecture enhancements for non-3GPP accesses (Release 13), Mar. 2015, 292 pages, V13.1.0, 3GPP Organizational Partners, Valbonne France.
(Continued)

*Primary Examiner* — Kamran Afshar
*Assistant Examiner* — Farid Sysedvosoghi
(74) *Attorney, Agent, or Firm* — Viering, Jentschura & Partner MBB (57) ABSTRACT

A communication terminal comprising a first communication component configured for communication using a first radio access technology, a second communication component configured for communication using a second radio access technology, wherein the first communication component is configured to communicate speech data of a call using the first radio access technology; and a controller configured to control the second communication component to generate transport protocol packets comprising speech
(Continued)

data of the call for uplink transmission of the speech data using the second radio access technology; and
to switch the call from the first radio access technology to the second radio access technology access technology after the second communication component begins generation of transport protocol packets for uplink transmission.

22 Claims, 5 Drawing Sheets

(51) Int. Cl.
    *H04W 88/06*      (2009.01)
    *H04W 84/12*      (2009.01)
    *H04W 36/02*      (2009.01)
    *H04W 76/16*      (2018.01)

(52) U.S. Cl.
    CPC ........ *H04W 36/023* (2013.01); *H04W 36/026* (2013.01); *H04W 76/16* (2018.02); *H04W 84/12* (2013.01); *H04W 88/06* (2013.01)

(58) Field of Classification Search
    CPC ........... H04W 76/026; H04W 36/0022; H04W 36/026; H04W 36/022; H04M 15/56; H04M 15/57
    USPC ......... 455/436, 437, 439, 442, 127.4, 127.5, 455/445, 428, 450; 370/352, 353, 354, 370/355, 319, 335, 337, 347, 395.5, 441, 370/442
    See application file for complete search history.

(56) References Cited

U.S. PATENT DOCUMENTS

| | | | |
|---|---|---|---|
| 2004/0114553 A1* | 6/2004 | Jiang | H04L 63/08 370/328 |
| 2006/0045069 A1 | 3/2006 | Zehavi et al. | |
| 2008/0020776 A1 | 1/2008 | Deshpande et al. | |
| 2009/0156217 A1* | 6/2009 | Bajpai | H04W 36/14 455/439 |
| 2012/0314650 A1* | 12/2012 | Medapalli | H04W 52/028 370/328 |
| 2013/0310055 A1* | 11/2013 | Dewing | H04L 12/145 455/450 |
| 2014/0098787 A1 | 4/2014 | Kim | |
| 2014/0286308 A1 | 9/2014 | Lee et al. | |
| 2014/0376511 A1 | 12/2014 | Kalapatapu et al. | |
| 2016/0205573 A1* | 7/2016 | Yang | H04W 24/10 370/241 |

OTHER PUBLICATIONS

Extended European Search Report received for corresponding EP Application No. 16154724.5 dated Sep. 2, 2016, 13 pages.
Taiwanese Office Action based on Application No. 105105517(17 Pages and 13 pages of English translation) dated Mar. 23, 2017 (Reference Purpose Only).
First search report for corresponding CN Patent Application No. 2016101087529, dated Oct. 15, 2018, 4 pages, including English translation. (Reference Purpose Only).

* cited by examiner

COMMUNICATION TERMINAL AND METHOD FOR SWITCHING A CALL BETWEEN RADIO ACCESS TECHNOLOGIES

TECHNICAL FIELD

Embodiments described herein generally relate to communication terminals and methods for switching a call between radio access technologies.

BACKGROUND

A handover between different radio access technologies, e.g. LTE and WiFi, is a feature of modern mobile communication devices that allows providing a user with a better user experience (e.g. optimized bandwidth) as well as lower costs and power consumption. Ideally, a user, for example communicating with another user, e.g. via a VoIP call, does not even notice such a handover during the communication. Accordingly, handover procedures which allow short interruption times and, e.g., a low number of audio artifacts are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
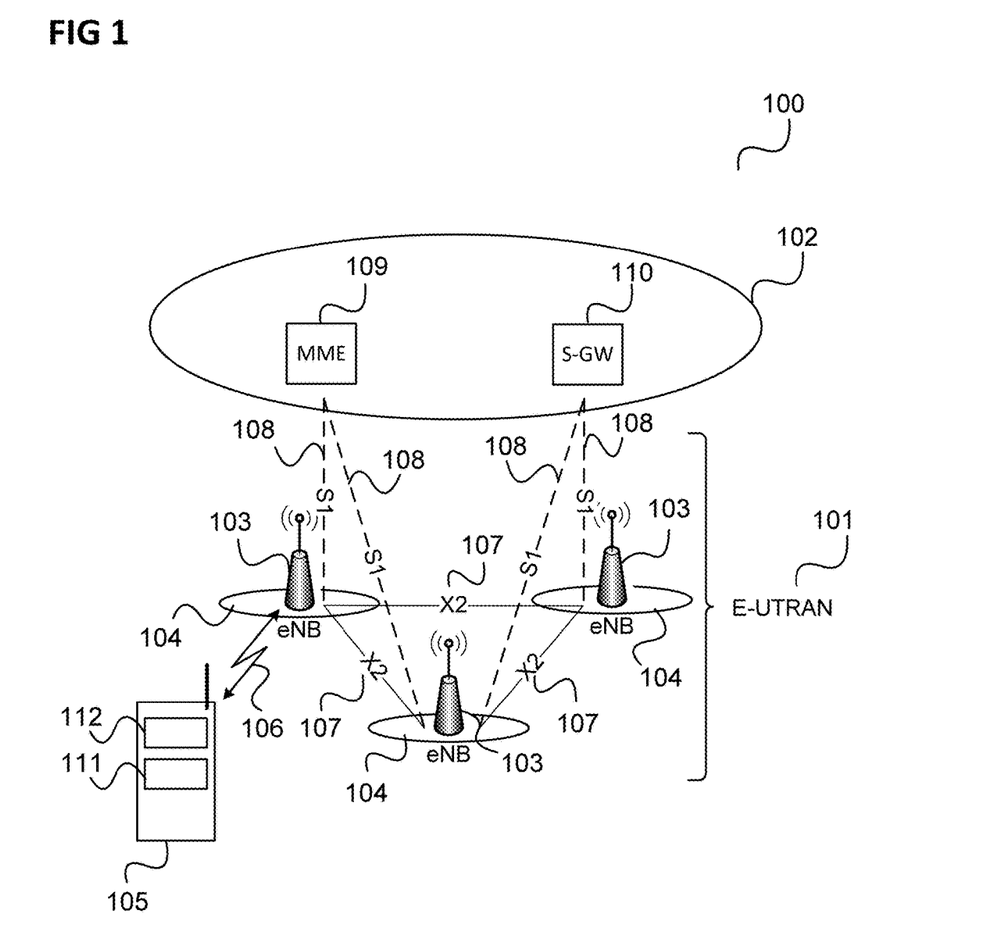
FIG. 1 shows a cellular communication system.

FIG. 1 shows a communication system 100, for example according to 3GPP (Third Generation Partnership Project).

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications), WIFI etc.

A mobile terminal (e.g. a UE) 105 located in a mobile radio cell 104 may communicate with the core network 102 and with other mobile terminals via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105. The mobile terminal 105 includes, among other typical components such as a speaker, a microphone and a memory, an application processor 111 and an LTE modem 112.

Control and user data may be transmitted between a base station 103 and a mobile terminal 105 located in the mobile radio cell 104 operated by the base station 103 over the air interface 106 on the basis of a multiple access method. On the mobile communication standard air interface, such as LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of mobile communication standard such as LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104)

it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

Using its connection to the E-UTRAN 101 and the core network 102, the mobile terminal 105 can communicate with other devices located in other networks, e.g. a server in the Internet, for example for downloading data using a TCP (Transport Control Protocol) connection according to FTP (File Transport Protocol).

The user of the mobile terminal 105 may communicate with the user of another mobile terminal via VoIP (Voice Over IP), e.g., in this example, VoLTE (Voice over LTE), based on IMS (Internet Multimedia Subsystem).

In IMS, VoIP calls can be provided over 2G/3G/LTE and over WiFi. To support both, a mobile terminal may have two different modems, one for cellular communications over 2G/3G/LTE and one for communications over WiFi, as illustrated in FIG. 2.

Figure 2:
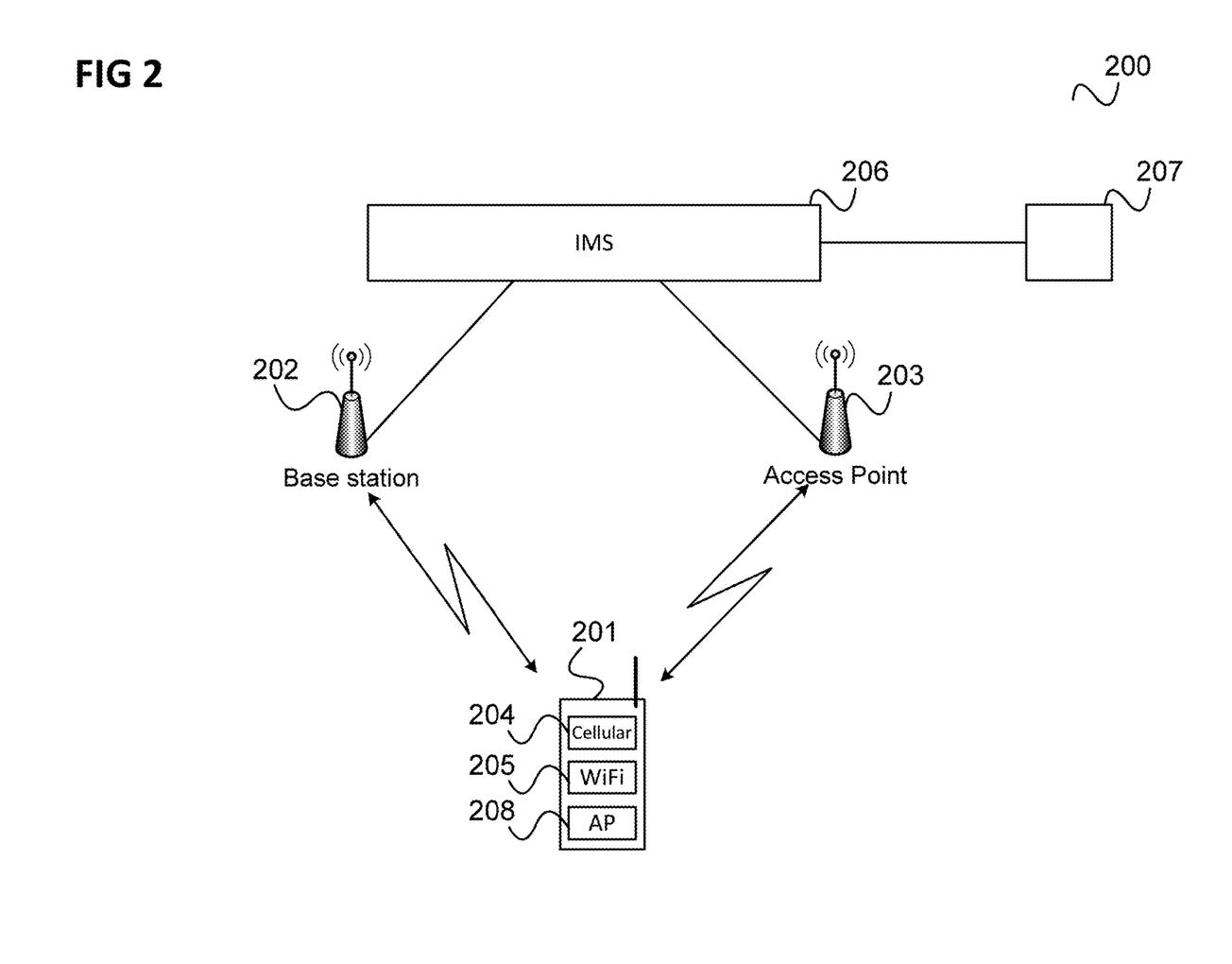
FIG. 2 shows a communication arrangement including a cellular base station and a WiFi access point.

FIG. 2 shows a communication arrangement 200.

The communication arrangement 200 comprises a mobile terminal 201, e.g. corresponding to mobile terminal 105, a cellular base station (e.g. a GSM, UMTS or LTE base station) 202 and a WiFi (or WLAN) access point 203.

The mobile terminal 201 comprises a cellular modem 204 which allows communication with an IMS 206 via the base station 202 and a WiFi modem 205 which allows communication with the IMS 204 via the access point 203. Via the IMS 206, a user of the mobile terminal 201 can communicate by means of a VoIP call with a user of another communication device 207, e.g. a further mobile terminal which is similarly connected to the IMS 206. The mobile terminal 201 further comprises an application processor 208.

In order to optimize VoIP call power consumption, the mobile terminal 201 may use a VoIP engine located on the cellular modem 204 for 2G/3G/LTE VoIP calls (leaving the remaining parts of the system idle, i.e. the application processor 208 and the WiFi modem 205) whereas for VoIP calls over WiFi, it may use a VoIP engine located on the application processor 208 or located on the WiFi modem 205 (leaving the cellular modem 204 idle during the WiFi VoIP call).

The mobile terminal 201 may also perform a handover of a VoIP from the cellular RAT (radio access technology) to WiFi and vice versa. However, in such a distributed architecture, optimized for power consumption, an issue is typically to handle such a handover such that the interruption time during the handover is minimized and no audio distortion is noticeable by the user.

In the following, a communication terminal is described which for example allows handling IMS VoIP handovers with VoIP engines relocations from a modem to another component (and back from the other component to the modem), e.g. another modem or an application processor, with minimized interruption time and minimized audio artifacts (e.g. limited to some silence during the very short interruption time).

Figure 3:
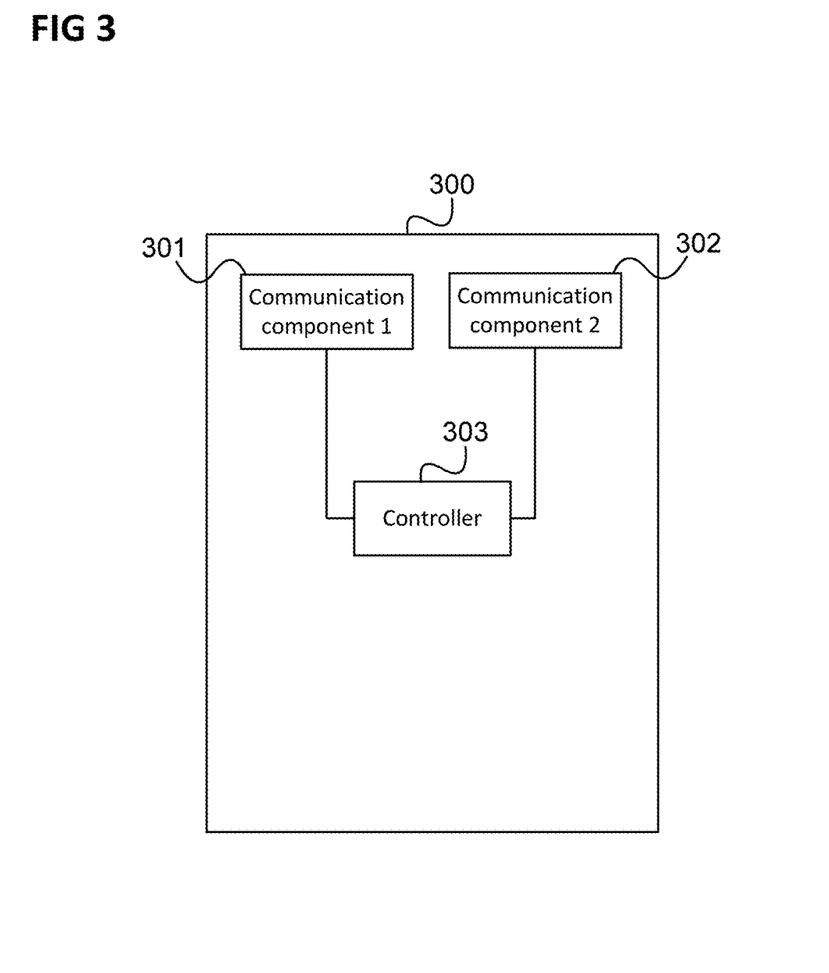
FIG. 3 shows a communication terminal.

FIG. 3 shows a communication terminal 300.

The communication terminal 300 comprises a first communication component 301 configured for communication using a first radio access technology and a second communication component 302 configured for communication using a second radio access technology. The first communication component is configured to communicate speech data of a call using the first radio access technology.

The communication terminal 300 further comprises a controller 303 configured to control the second communication component 302 to generate transport protocol packets comprising speech data of the call for uplink transmission of the speech data using the second radio access technology and to switch the call from the first radio access technology to the second radio access technology access technology after (or when) the second communication component 302 begins generating the transport protocol packets for uplink transmission (i.e. uplink transmission of media data of the call), e.g. after it has successfully started the generation of transport protocol packets for uplink transmission, e.g. when a necessary setup or configuration such as a loading of firmware, setup of new audio paths in the communication terminal, and/or allocation of communication resources has been completed.

In other words, for example, a handover of a call is performed from a first radio access technology to a second radio access technology when the communication module supporting the second radio access technology has completed its configuration or setup for taking over the call in terms of it having started generation of uplink transport protocol packets. For example, the call is a VoIP call and the first communication component provides (together with, e.g., components of a first communication network, e.g. an LTE network) a first VoIP path and the VoIP call is switched to a second VoIP path provided by the second communication component (together with, e.g., components of a second communication network, e.g. a WiFi network).

This allows keeping the interruption time of the call, when the handover is performed, low and allows avoiding audio artifacts caused by the handover.

Further, the communication terminal may cope with high jitter during the handover. Even if it uses buffering of transport protocol packets at the time of the handover to protect against network jitter it may avoid the buffered packets being lost during the handover by relocating them as well to the second communication component and playing them out in the expected order (potentially interleaved with packets received after the handover).

The components of the communication device (e.g. the communication components and the controller) may for example be implemented by one or more circuits. A "circuit" may be understood as any kind of a logic implementing entity, which may be special purpose circuitry or a processor executing software stored in a memory, firmware, or any combination thereof. Thus, a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

It should be noted that various components, for example the controller and the second communication component, may be implemented by the same processor, e.g. by running different frameworks or engines on the processor.

Figure 4:
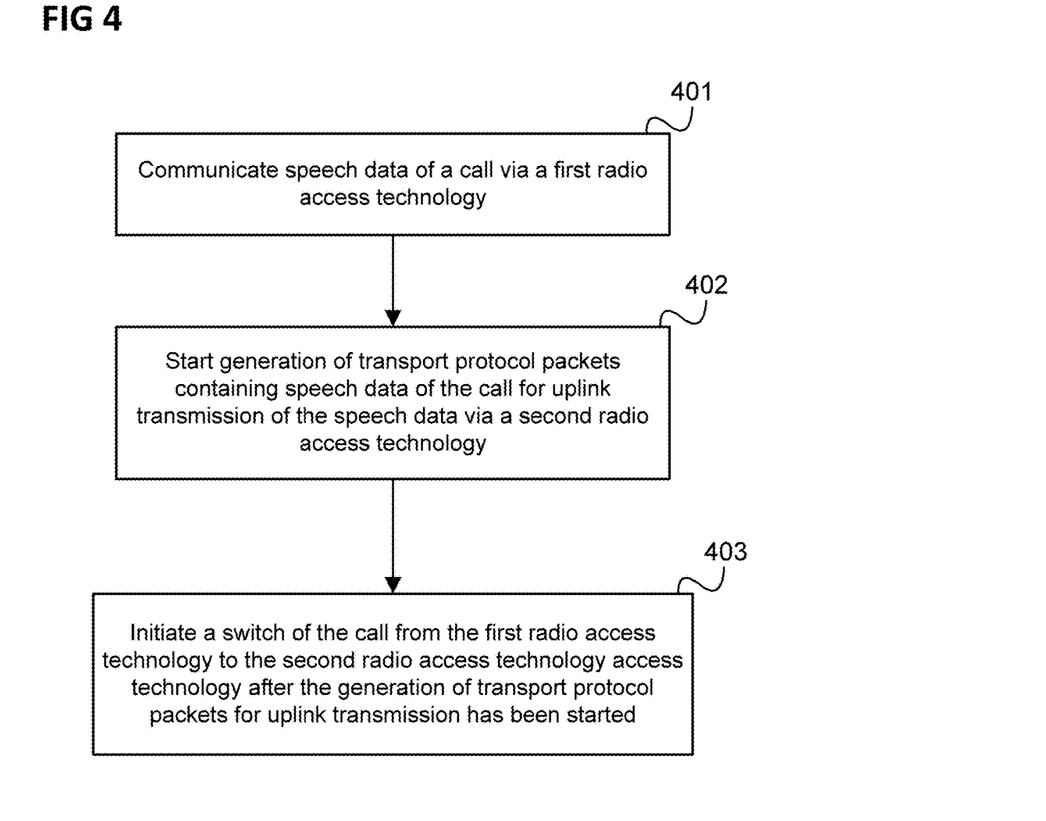
FIG. 4 shows a flow diagram illustrating a method for switching a call between radio access technologies.

The communication terminal 300 for example carries out a method for switching a call from a first radio access technology to a second radio access technology as illustrated in FIG. 4.

FIG. 4 shows a flow diagram 400.

The flow diagram 400 illustrates a method for switching a call between radio access technologies, for example carried out by a communication terminal.

In 401, the communication terminal communicates speech data of a call using a first radio access technology.

In 402, the communication terminal generates transport protocol packets comprising speech data of the call for uplink transmission of the speech data using a second radio access technology.

In 403, the communication terminal switches the call from the first radio access technology to the second radio access technology access technology after the generation of transport protocol packets for uplink transmission is begun.

The following examples pertain to further embodiments

Example 1 is a communication terminal as illustrated in FIG. 3.

In Example 2, the subject matter of Example 1 may optionally include the controller being configured to determine whether a predetermined handover criterion being fulfilled and, if the predetermined handover criterion being fulfilled, to control the second communication component to generate transport protocol packets.

In Example 3, the subject matter of Example 2 may optionally include the predetermined handover criterion being based on at least one of a media communication quality of the call, user preferences, operator preferences and radio quality measurements for at least one of the first radio access technology and the second radio access technology.

In Example 4, the subject matter of any one of Examples 1-3 may optionally include the controller being implemented by an application processor of the communication terminal.

In Example 5, the subject matter of any one of Examples 1-4 may optionally include the first communication component being at least partially implemented by a modem or an application processor of the communication terminal.

In Example 6, the subject matter of any one of Examples 1-5 may optionally include the second communication component being at least partially implemented by a modem or an application processor of the communication terminal.

In Example 7, the subject matter of any one of Examples 1-6 may optionally include the call being an IMS call.

In Example 8, the subject matter of any one of Examples 1-7 may optionally include the call being a VoIP call.

In Example 9, the subject matter of any one of Examples 1-8 may optionally include the first radio access technology being a cellular mobile radio network radio access technology and the second radio access technology being a wireless local area network radio access technology or the first radio access technology being a wireless local area network radio access technology and the second radio access technology being a cellular mobile radio network radio access technology.

In Example 10, the subject matter of any one of Examples 1-9 may optionally include the transport protocol packets being real-time transport protocol (RTP) packets.

In Example 11, the subject matter of any one of Examples 1-10 may optionally include initiating a switch of the call comprising transmitting a message to a communication network providing the call indicating that the call is to be switched from the first radio access technology to the second radio access technology.

In Example 12, the subject matter of any one of Examples 1-11 may optionally include the controller being configured to switch the call from the first radio access technology to the second radio access technology access technology when a setup of a communication path for the call using the second radio access technology, including the starting of generation of transport protocol packets for uplink transmission, is completed.

In Example 13, the subject matter of Example 12 may optionally include the setup of the communication path further comprising at least one of setting loading program instructions into a memory and setting up one or more audio paths.

In Example 14, the subject matter of any one of Examples 1-13 may optionally include the controller being configured to control the second communication component to discard generated transport protocol packets before the call is switched from the first radio access technology to the second radio access technology and to stop discarding generated transport protocol packets when the call is switched from the first radio access technology to the second radio access technology.

In Example 15, the subject matter of any one of Examples 1-14 may optionally include the controller being configured to control the second communication component to mute the output of audio data received using the second radio access technology before the call is switched from the first radio access technology to the second radio access technology and to stop muting the output of audio data received using the second radio access technology when the call is switched from the first radio access technology to the second radio access technology.

In Example 16, the subject matter of any one of Examples 1-15 may optionally include the controller being configured to control the transfer of buffered transport protocol packets received by the first communication component to the second communication component upon the switch of the call from the first radio access technology to the second radio access technology.

In Example 17, the subject matter of any one of Examples 1-16 may optionally include controlling the second communication component to generate transport protocol packets including instructing the second communication component to start generation of transport protocol packets.

In Example 18, the subject matter of any one of Examples 1-17 may optionally include controlling the second communication component to generate transport protocol packets including controlling the second communication component to set up a communication path for the call.

Example 19 is a method for switching a call between radio access technologies as illustrated in FIG. 4.

In Example 20, the subject matter of Example 19 may optionally include determining whether a predetermined handover criterion being fulfilled and, if the predetermined handover criterion being fulfilled, generating transport protocol packets.

In Example 21, the subject matter of Example 20 may optionally include the predetermined handover criterion being based on at least one of a media communication quality of the call, user preferences, operator preferences and radio quality measurements for at least one of the first radio access technology and the second radio access technology.

In Example 22, the subject matter of any one of Examples 19-21 may optionally include an application processor of a communication terminal starting the generation of transmission control packets and initiating the switch.

In Example 23, the subject matter of any one of Examples 19-22 may optionally include a modem or an application processor of the communication terminal communicating speech data of the call using the first radio access technology.

In Example 24, the subject matter of any one of Examples 19-23 may optionally include a modem or an application processor of the communication terminal communicating speech data of the call using the first radio access technology.

In Example 25, the subject matter of any one of Examples 19-24 may optionally include the call being an IMS call.

In Example 26, the subject matter of any one of Examples 19-25 may optionally include the call being a VoIP call.

In Example 27, the subject matter of any one of Examples 19-26 may optionally include the first radio access technology being a cellular mobile radio network radio access technology and the second radio access technology being a wireless local area network radio access technology or the first radio access technology being a wireless local area network radio access technology and the second radio access technology being a cellular mobile radio network radio access technology.

In Example 28, the subject matter of any one of Examples 19-28 may optionally include the transport protocol packets being real-time transport protocol packets.

In Example 29, the subject matter of any one of Examples 19-28 may optionally include initiating a switch of the call comprising transmitting a message to a communication network providing the call indicating that the call is to be switched from the first radio access technology to the second radio access technology.

In Example 30, the subject matter of any one of Examples 19-29 may optionally include initiating a switch of the call from the first radio access technology to the second radio access technology access technology when a setup of a communication path for the call using the second radio access technology, including the starting of generation of transport protocol packets for uplink transmission, is completed.

In Example 31, the subject matter of Example 30 may optionally include the setup of the communication path further comprising at least one of setting loading program instructions into a memory and setting up one or more audio paths.

In Example 32, the subject matter of any one of Examples 19-31 may optionally include discarding generated transport protocol packets before the call is switched from the first radio access technology to the second radio access technology and stopping discarding generated transport protocol packets when the call is switched from the first radio access technology to the second radio access technology.

In Example 33, the subject matter of any one of Examples 19-32 may optionally include muting the output of audio data received using the second radio access technology before the call is switched from the first radio access technology to the second radio access technology and stopping muting the output of audio data received using the second radio access technology when the call is switched from the first radio access technology to the second radio access technology.

In Example 34, the subject matter of any one of Examples 19-33 may optionally include transferring buffered transport protocol packets received using the first radio access technology to a communication component for communicating using the second radio access technology upon the switch of the call from the first radio access technology to the second radio access technology.

In Example 35, the subject matter of any one of Examples 19-34 may optionally include instructing a communication component for communication using the second radio access technology to start generation of transport protocol packets.

In Example 36, the subject matter of any one of Examples 19-37 may optionally include controlling a communication component for communication using the second radio access technology to set up a communication path for the call.

Example 37 is a computer readable medium having recorded instructions thereon which, when executed by a processor, make the processor perform a method for switching a call between radio access technologies according to any one of Examples 19 to 38.

Example 38 is a method to enable at least one of VoIP and IMS devices that are WiFi and cellular capable, that enables, on one side, optimal device power consumption and optimal audio latency before and after a handover, and on the other side, a smooth engine relocation and reconfiguration procedure, when switching from one radio access technology to another.

In Example 39, the subject matter of Example 38 may optionally include the optimal power consumption and optimal latency, before and after the handover, being guaranteed via VoIP engine relocation and eventually also acoustics engine relocation during a VoIP call.

In Example 40, the subject matter of Example 39 may optionally include the VoIP engine and acoustics engine relocation procedure being designed to minimize, during the handover reconfiguration, interruption time, audio artifacts and RTP (Real-time transport protocol) packet losses.

Example 41 is a communication terminal comprising a first communication means for communicating using a first radio access technology, a second communication means for communicating using a second radio access technology, wherein the first communication means being for communicate speech data of a call using the first radio access technology; and a controlling means for controlling the second communication means to generate transport protocol packets comprising speech data of the call for uplink transmission of the speech data using the second radio access technology; and initiating a switch of the call from the first radio access technology to the second radio access technology access technology after the second communication means begins generation of transport protocol packets for uplink transmission.

In Example 42, the subject matter of Example 41 may optionally include the controlling means being for determining whether a predetermined handover criterion being fulfilled and, if the predetermined handover criterion being fulfilled, controlling the second communication means to generate transport protocol packets.

In Example 43, the subject matter of Example 42 may optionally include the predetermined handover criterion being based on at least one of a media communication quality of the call, user preferences, operator preferences and radio quality measurements for at least one of the first radio access technology and the second radio access technology.

In Example 44, the subject matter of any one of Examples 41-43 may optionally include the controlling means being implemented by an application processor of the communication terminal.

In Example 45, the subject matter of any one of Examples 41-44 may optionally include the first communication means being at least partially implemented by a modem or an application processor of the communication terminal.

In Example 46, the subject matter of any one of Examples 41-45 may optionally include the second communication means being at least partially implemented by a modem or an application processor of the communication terminal.

In Example 47, the subject matter of any one of Examples 41-46 may optionally include the call being an IMS call.

In Example 48, the subject matter of any one of Examples 41-47 may optionally include the call being a VoIP call.

In Example 49, the subject matter of any one of Examples 41-48 may optionally include the first radio access technology being a cellular mobile radio network radio access technology and the second radio access technology being a wireless local area network radio access technology or the first radio access technology being a wireless local area network radio access technology and the second radio access technology being a cellular mobile radio network radio access technology.

In Example 50, the subject matter of any one of Examples 41-49 may optionally include the transport protocol packets are real-time transport protocol packets.

In Example 51, the subject matter of any one of Examples 41-50 may optionally include initiating a switch of the call comprising transmitting a message to a communication network providing the call indicating that the call is to be switched from the first radio access technology to the second radio access technology.

In Example 52, the subject matter of any one of Examples 41-51 may optionally include the controlling means being for initiating a switch of the call from the first radio access technology to the second radio access technology access technology when a setup of a communication path for the call using the second radio access technology, including the starting of generation of transport protocol packets for uplink transmission, is completed.

In Example 53, the subject matter of Example 52 may optionally include the setup of the communication path further comprising at least one of setting loading program instructions into a memory and setting up one or more audio paths.

In Example 54, the subject matter of any one of Examples 41-53 may optionally include the controlling means being for controlling the second communication means to discard generated transport protocol packets before the call is switched from the first radio access technology to the second radio access technology and for stopping discarding generated transport protocol packets when the call is switched from the first radio access technology to the second radio access technology.

In Example 55, the subject matter of any one of Examples 41-54 may optionally include the controlling means being for controlling the second communication means to mute the output of audio data received using the second radio access technology before the call is switched from the first radio access technology to the second radio access technology and for stopping muting the output of audio data received using the second radio access technology when the call is switched from the first radio access technology to the second radio access technology.

In Example 56, the subject matter of any one of Examples 41-55 may optionally include the controlling means being for controlling the transfer of buffered transport protocol packets received by the first communication means to the second communication means upon the switch of the call from the first radio access technology to the second radio access technology.

In Example 57, the subject matter of any one of Examples 41-56 may optionally include controlling the second communication means to generate transport protocol packets including instructing the second communication means to generate of transport protocol packets.

In Example 58, the subject matter of any one of Examples 41-57 may optionally include controlling the second communication means to start generation of transport protocol packets including controlling the second communication means to set up a communication path for the call.

It should be noted that one or more of the features of any of the examples above may be combined with any one of the other examples. For example, the details of how Examples 38 to 40 are may be given by Examples 19 to 37.

In the following, examples are described in more detail.

For example, one or more of the following is performed for handover execution and VoIP engine relocation.

A setup of the second communication component (e.g. the VoIP WiFi engine in the following example) is performed before the interruption (or break) of the VoIP call, i.e. the switch from the first radio access technology to the second radio access technology to diminish interruption time. The switching or handover procedure is split into three phases:
 a preparation phase
 an execution phase (including the actual switch)
 a termination phase.

These phases are for example triggered by commands from an external telephony/WiFi framework (which is for example in charge of cellular or WiFi signaling and control).

During the preparation phase two VoIP paths are enabled in parallel during the transition (i.e. switching) phase (with the new VoIP path being muted and the old VoIP path being unmuted).

During the execution phase, the new VoIP path is unmuted and the old VoIP path is muted. Unplayed RTP audio packets are transferred from the old JBM (Jitter Buffer Management) buffer (i.e. the JBM buffer of the first radio access technology in the mobile terminal) to the new JBM buffer (i.e. the JBM buffer of the second radio access technology in the mobile terminal). The RTP timestamp of the next packet that was expected to be played is transferred from the old JBM buffer to the new JBM buffer. These transferred packets are reordered with the newly received RTP packets (i.e. the RTP packets received via the new VoIP path) or discarded if their playout time has elapsed.

During the termination phase communication resources for providing the old VoIP path (e.g. radio channel resources) are released. For example, a lip synchronization may be started for the new VoIP path (if video was part of the ongoing call).

It should be noted that from a pure handover point of view, in order to minimize interruption time and audio artifacts, the best approach is typically to use a VoIP engine that is not relocated. In other words, having a VoIP engine always located on the APE (Application Processor Entity), i.e. the application processor, would be ideal to handle handovers. However, this approach may not be desirable because it leads to a high power consumption for VoLTE and a minimized VoLTE power consumption is a typical goal of mobile terminal manufacturers.

Moreover, a handover is an action of relatively short duration that can be expected to happen rather infrequently (switching from LTE to WiFi and vice et versa) whereas a VoLTE call is typically the key use case with long duration.

The approach described above with reference to FIG. 3 allows providing a VoLTE call and supporting high end IMS features with IMS VoIP calls and video calls over WiFi and handovers from 2G/3G/LTE to WiFi (and vice et versa).

It should further be noted that the switch from VoLTE to WiFi (and vice et versa) may be, as in the following example, initiated by the mobile terminal rather than the network side e.g. according to 3GPP. Key items of the handover procedure to/from WiFi according to 3GPP may be seen in that an IPsec tunnel is established on the network side so that the mobile terminal's IP address is kept unchanged when it moves from LTE to WiFi;

the completion of this tunnel setup triggers the media switch from an underlying LTE bearer to an underlying WiFi bearer and Network service continuity is guaranteed in a smooth way.

So, the IP addresses and ports used for the VoLTE and IMS VoIP call after the switch are not changed during the switch in this handover procedure.

The handover from VoLTE to WiFi being terminal initiated (in contrast to, for example, a switch from 3G to LTE (and vice et versa) which is network initiated) makes it easier to setup a preparation phase on the mobile terminal before executing the switch.

The handover procedure is in the following example described based on the example of a switch from LTE to WIFI. However, the same principles and actions can be applied to a handover from WiFi to cellular.

Figure 5:
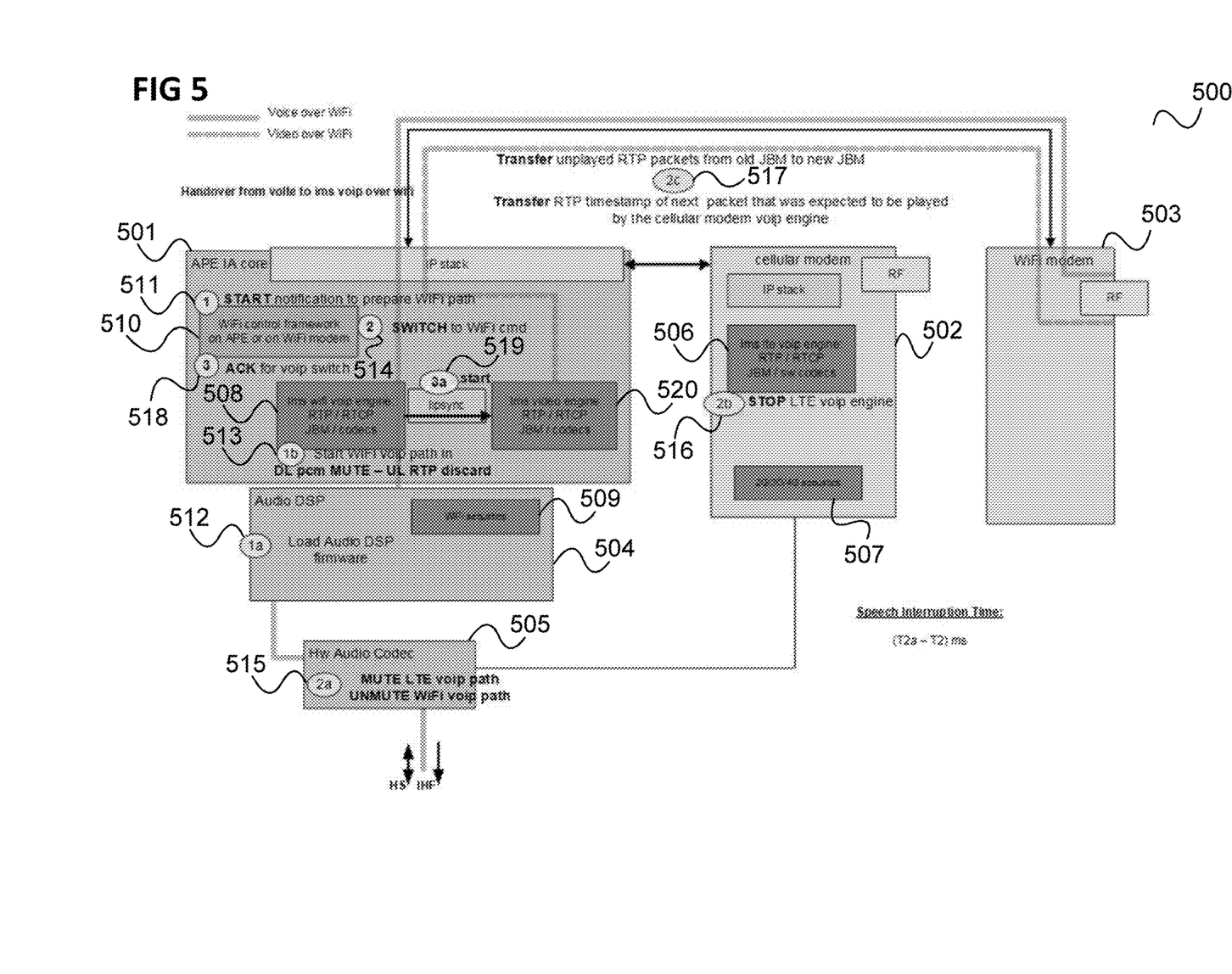
FIG. 5 shows an architecture of a mobile terminal related to a handover from a VoIP call from a cellular radio access technology to WiFi.

FIG. 5 shows an architecture of a mobile terminal related to a handover from a VoIP call from a cellular radio access technology to WiFi.

The mobile terminal, e.g. corresponding to mobile terminal 201, comprises an application processor 501, a cellular modem 502, a WiFi modem 503, an audio DSP (digital signal processor) 504 and a hardware audio codec 505.

In the following example, initially, during a VoLTE call, the software components providing the VoIP call, including an LTE VoIP engine 506 and cellular acoustic functions 507 (e.g. speech enhancements such as noise reduction and echo cancellation) are executed on the cellular modem 502, thus allowing a low VoLTE power consumption.

After the switch, the VoIP engine and the acoustic functions are relocated and a WiFi VoIP engine 508 and WiFi acoustic functions 509 are provided by the application processor 501 and the audio DSP 504 (or, alternatively, also by the application processor 501) such that the cellular modem can remain idle during the IMS VoIP call via WiFi.

A switching (or handover) procedure allowing a short interruption time and avoiding RTP packets losses and audio distortions during the switch is described in the following.

The switch is performed in three steps (preparation, execution and termination phases) where the triggers are in this example sent by a signaling/control framework 510 provided by the application processor 501.

The control framework 510 is in charge of collecting information like measurements reports on the current radio technology (LTE in this example) and also on the other candidate radio technology (WiFi in this example). This is a background activity that may be performed without frequent wake ups of the application processor 501, especially as long as the audio quality on the ongoing VoIP call is good.

The control framework 510 may for example trigger a handover based on a criterion depending on one or more of the following:

Audio and/or media quality of the ongoing VoIP call, e.g. reported by media engines;

Operator and/or user preferences for one radio access technology over the other;

Radio measurements, e.g. reported by the modems 502, 503.

For example, based on a part or all of this information, a policy may be used to prepare and execute a handover without requiring frequent wakeups of the application processor 501.

Assuming that a some point in time during the VoLTE call, i.e. the VoIP call provided via LTE, the control framework 510 detects that a handover criterion is fulfilled (e.g. if the media quality of ongoing call is below a predefined threshold or if radio signal measurements reported on WiFi are above a predefined threshold), it issues, in 511, a preparation (or start) command and thus triggers the preparation phase (phase 1).

In 512 and 513, which correspond to the setup of the new VoIP path, the audio DSP 504 loads its firmware and the WiFi VoIP engine 508 starts uplink RTP packet generation.

The new VoIP path is set up but not yet used but muted. For example, the generated uplink RTP packets are discarded and audio data (in the form of PCM samples) that may already be received via the new VoIP path are not played.

The setup of the new VoIP path including, for example, the loading of specific firmware of the audio DSP 504, setting up new audio routes etc. takes time so this is done before the control framework 510 triggers the actual switching.

When the new VoIP path setup has been completed, e.g. by an audio framework, it may for example send an acknowledgement message to the telephony/WiFi control framework 510. Then, in 514, if the criterion for the handover is still valid after the setup of the new VoIP path, the control framework 510, sends a remote trigger to the network if the handover is mobile terminal initiated and sends a local trigger for executing the switch to the audio framework which triggers the execution phase (phase 2). If the criterion is no longer fulfilled, the control framework 510 may for example cancel the handover and the setup of the new VoIP path immediately or after a predetermined timeout.

During the execution phase, in 515, the new VoIP path is unmuted and the old VoIP path is muted. At this point of time, the audio data received via the second radio access technology (WiFi in this example) can be played. Thus, the interruption time can be kept low, even with a distributed architecture that has to handle VoIP engine relocation and the setup of a new VoIP path.

It should be noted that at the point of time when the handover is executed, there could be some ongoing network jitter. This is even highly probable when radio conditions degrade, so it can be expected that a handover is initiated when there is high network jitter and thus when the mobile terminal uses RTP packet buffering to protect against the jitter.

In 516, the LTE VoIP engine is stopped wherein in 517, to avoid losing the RTP packets buffered (on the cellular modem side) but not yet played, which would create an audio glitch, these RTP packets are transferred from the VoLTE JBM buffer (on the cellular modem 502) to the WiFi JBM buffer (on the application processor 501). The transferred RTP packets are handled by the WiFi JBM as if they were just received via the WiFi VoIP path: depending on their sequence numbers and/or RTP timestamps they are reordered and played out as long as their expected playout time has not yet elapsed (otherwise the WiFi JBM discards them). As one RTP packet typically corresponds to 20 ms of speech and it can be expected that the transfer from the VoLTE JBM buffer to the WiFi JBM buffer takes place in less than 20 ms, no RTP packet will presumably be lost or discarded due to the transfer latency (or just one RTP packet in case that, when starting the transfer, the expected processing of a new RTP packet is already close).

At this point of time, the new VoIP path is fully functional, processing newly received RTP packets and eventually playing out old RTP packets that were buffered before the handover.

Thus, the audio framework can acknowledge that the second phase has been completed (and e.g. inform the control framework 510 accordingly) and, in 518, the control framework 510 triggers the termination phase (phase 3) and instructs the cellular modem 502 to release the old VoIP path.

In 519, for example, a lip synchronization may be activated if the VoIP call is a video call, wherein the video is now provided an video engine 520 running on the application processor 501.

The above mechanism allows a VoLTE power optimized approach which may be used for devices supporting IMS VoIP over WiFi, audio/video calls and handovers to other radio technologies and which allows having a very low interruption time and very few audio artifacts during the switch.

It should be noted that a switch from WiFi to LTE may be performed using a similar sequence and similar principles.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A user equipment device (UE) comprising:
a first communication circuit configured for communication using a first radio access technology;
a second communication circuit configured for communication using a second radio access technology;
wherein the first communication circuit is configured to communicate speech data of a call using the first radio access technology;
a first buffer configured to manage jitter of the first radio access technology;
a second buffer configured to manage jitter of the second radio access technology; and
a controller configured to
control the second communication circuit to generate transport protocol packets comprising speech data of the call for uplink transmission of the speech data using the second radio access technology;
initiate a handover of the call from the first radio access technology to the second radio access technology after the second communication circuit begins generating the transport protocol packets for uplink transmission; and
to transfer unplayed transport protocol packets from the first buffer to the second buffer with a protocol packet timestamp for a next protocol packet, and to reorder the transferred unplayed protocol packets for inclusion with protocol packets received on the second communication circuit.

2. The communication terminal of claim 1, wherein the controller is configured to determine whether a predetermined handover criterion is fulfilled and, if the predetermined handover criterion is fulfilled, to control the second communication circuit to generate transport protocol packets.

3. The communication terminal of claim 2, wherein the predetermined handover criterion is based on at least one of a media communication quality of the call, user preferences, operator preferences and radio quality measurements for at least one of the first radio access technology and the second radio access technology.

4. The communication terminal of claim 1, wherein the controller is implemented by an application processor of the communication terminal.

5. The communication terminal of claim 1, wherein the first communication circuit is at least partially implemented by a modem or an application processor of the communication terminal.

6. The communication terminal of claim 1, wherein the second communication circuit is at least partially implemented by a modem or an application processor of the communication terminal.

7. The communication terminal of claim 1, wherein the call is an Internet Multimedia Subsystem (IMS) call.

8. The communication terminal of claim 1, wherein the call is a Voice over Internet Protocol (VoIP) call.

9. The communication terminal of claim 1, wherein the first radio access technology is a cellular mobile radio network radio access technology and the second radio access technology is a wireless local area network radio access technology or wherein the first radio access technology is a wireless local area network radio access technology and the second radio access technology is a cellular mobile radio network radio access technology.

10. The communication terminal of claim 1, wherein the transport protocol packets are real-time transport protocol packets.

11. The communication terminal of claim 1, wherein initiating a switch of the call comprises transmitting a message to a communication network providing the call indicating that the call is to be switched from the first radio access technology to the second radio access technology.

12. The communication terminal of claim 1, wherein the controller is configured to switch the call from the first radio access technology to the second radio access technology when a setup of a communication path for the call using the second radio access technology, including the starting of generation of transport protocol packets for uplink transmission, is completed.

13. The communication terminal of claim 12, wherein the setup of the communication path further comprises at least one of setting loading program instructions into a memory and setting up one or more audio paths.

14. The communication terminal of claim 1, wherein the controller is configured to control the second communication circuit to discard generated transport protocol packets before the call is switched from the first radio access technology to the second radio access technology and to stop discarding generated transport protocol packets when the call is switched from the first radio access technology to the second radio access technology.

15. The communication terminal of claim 1, wherein the controller is configured to control the second communication circuit to mute the output of audio data received using the second radio access technology before the call is switched from the first radio access technology to the second radio access technology and to stop muting the output of audio data received using the second radio access technology when the call is switched from the first radio access technology to the second radio access technology.

16. The communication terminal of claim 1, wherein the controller is configured to control the transfer of buffered transport protocol packets received by the first communication circuit to the second communication circuit upon the switch of the call from the first radio access technology to the second radio access technology.

17. The communication terminal of claim 1, wherein controlling the second communication circuit to generate transport protocol packets includes instructing the second communication circuit to generate of transport protocol packets.

18. The communication terminal of claim 1, wherein controlling the second communication circuit to generate transport protocol packets includes controlling the second communication circuit to set up a communication path for the call.

19. A method for switching a call between radio access technologies during a handover comprising:
  communicating speech data of a call using a first radio access technology (RAT) along a first communication path;
  setting up a second path for communication of speech data of the call using a second RAT before triggering a switch of the call from the first RAT to the second RAT is triggered;
  generating transport protocol packets comprising speech data of the call using the first radio access technology for uplink transmission of the speech data using the second radio access technology; and
  switching the call from the first radio access technology to the second radio access technology access technology after generating transport protocol packets for uplink transmission is begun;
  wherein the internet protocol (IP) address remains the same during the switching of the call from the first radio access technology to the second radio access technology; and
  releasing one or more resources of the first radio access technology upon completion of the switch.

20. A non-transitory computer readable medium having recorded instructions thereon which, when executed by a processor, make the processor perform a method for switching a call between radio access technologies according to claim 19.

21. A method to enable a user equipment device configured to operate according to a Voice over Internet Protocol (VoIP) that is WiFi and cellular capable, that enables, on one side, optimal device power consumption and optimal audio latency before and after a handover initiated by the user equipment device, and on the other side, a smooth engine relocation and reconfiguration procedure, when switching from one radio access technology to another; wherein a VoIP engine relocation during a VoIP call and eventually also an acoustics engine relocation occurs during the VoIP call; wherein the VoIP engine is relocated from a modem to an application processor or from an application processor to a modem.

22. The method of claim 21, wherein the VoIP engine and acoustics engine relocation procedure is designed to minimize, during the handover reconfiguration, interruption time, audio artifacts and Real-Time Transport Protocol (RTP) packet losses.

* * * * *